United States Patent
Suto

(10) Patent No.: US 11,340,726 B2
(45) Date of Patent: May 24, 2022

(54) APPARATUS AND METHOD FOR DETECTING PRESS

(71) Applicant: ALPINE ELECTRONICS, INC., Tokyo (JP)

(72) Inventor: Shunichi Suto, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 17/097,531

(22) Filed: Nov. 13, 2020

(65) Prior Publication Data
US 2021/0173541 A1  Jun. 10, 2021

(30) Foreign Application Priority Data

Dec. 4, 2019 (JP) .............................. JP2019-219487

(51) Int. Cl.
*G06F 3/041* (2006.01)
*G06F 3/0488* (2022.01)
*G06F 3/0482* (2013.01)

(52) U.S. Cl.
CPC ........ *G06F 3/04146* (2019.05); *G06F 3/0488* (2013.01); *G06F 3/0482* (2013.01); *G06F 3/04182* (2019.05)

(58) Field of Classification Search
CPC .. G06F 3/04182; G06F 3/0488; G06F 3/0482; G06F 3/04146; G06F 3/04883; G06F 3/0416; G06F 2203/04105
USPC ........................................ 345/173, 156, 158
See application file for complete search history.

(56) References Cited

U.S. PATENT DOCUMENTS

| | | | |
|---|---|---|---|
| 2011/0260991 A1* | 10/2011 | Aono | H03K 17/96 345/173 |
| 2012/0026110 A1 | 2/2012 | Yamano | |
| 2015/0116205 A1* | 4/2015 | Westerman | G06F 3/044 345/156 |
| 2015/0301684 A1 | 10/2015 | Shimamura | |
| 2016/0370909 A1 | 12/2016 | Wang et al. | |
| 2019/0227630 A1* | 7/2019 | Masamoto | G06F 3/0416 |

FOREIGN PATENT DOCUMENTS

JP    2014-142813    8/2014

OTHER PUBLICATIONS

Extended European Search Report for 20209804.2 dated May 7, 2021, 10 pgs.

* cited by examiner

*Primary Examiner* — Jimmy H Nguyen
(74) *Attorney, Agent, or Firm* — Crowell & Moring LLP

(57) ABSTRACT

In a first state before a first event is detected, a determination unit of a press detection apparatus prevents a definitive value from increasing steeply when the pressing force has increased steeply, and decreases the definitive value steeply when the pressing force has decreased steeply. In a second state after the first event is detected and before a second event is detected, the determination unit prevents the definitive value from increasing steeply when the pressing force has increased steeply, and prevents the definitive value from decreasing steeply when the pressing force has decreased steeply. This reduces the possibility that the definitive value increases steeply in the first state and increases and decreases steeply in the second state even under vibration.

16 Claims, 6 Drawing Sheets

AREA ENCLOSED BY [ ] ⋯ CONTACT DETECTABLE AREA 3
AREA ENCLOSED BY [ ] ⋯ PRESS DETECTABLE AREA 5

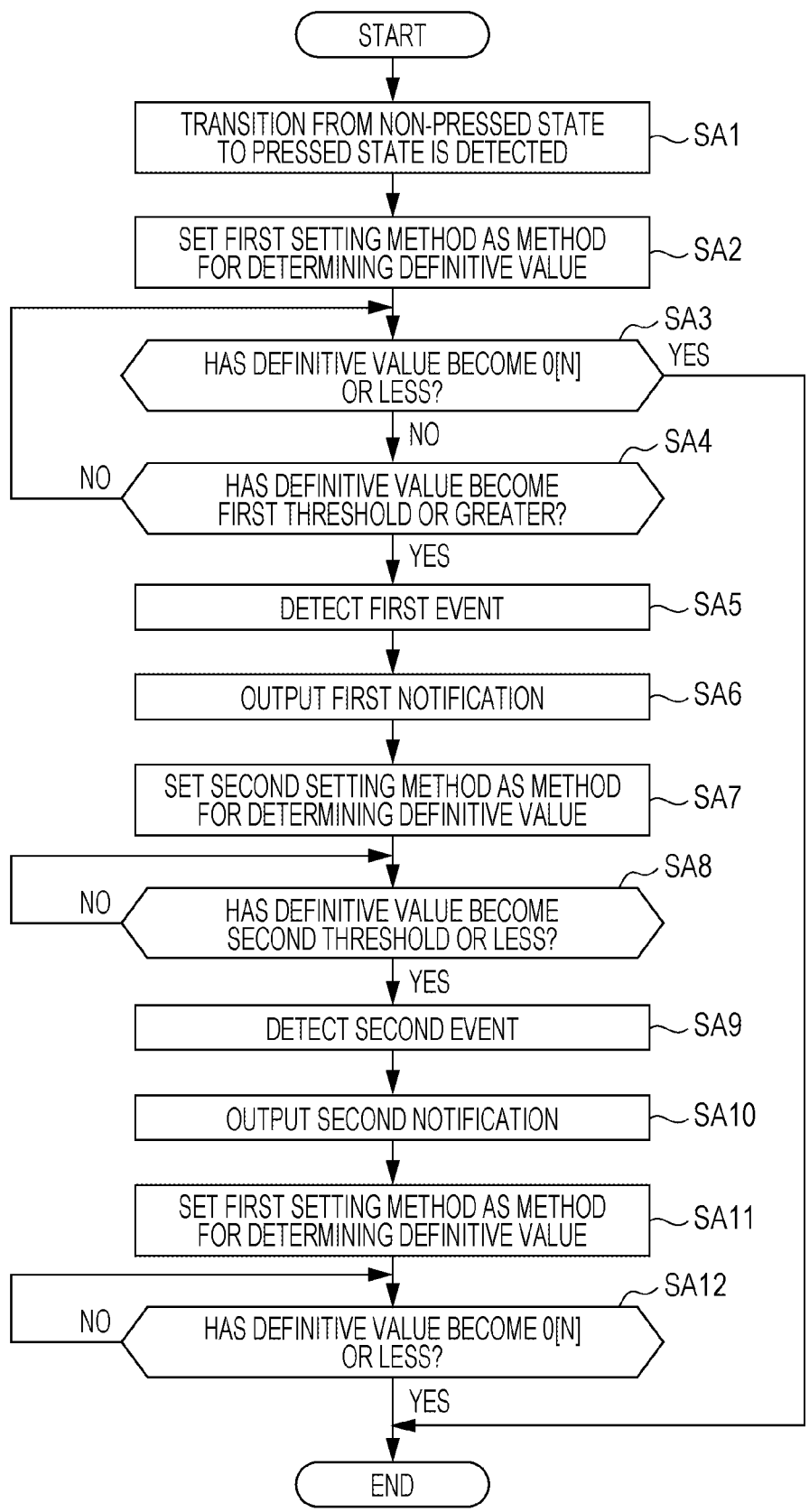

APPARATUS AND METHOD FOR DETECTING PRESS

RELATED APPLICATION

The present application claims priority to Japanese Patent Application Number 2019-219487, filed Dec. 4, 2019, the entirety of which is hereby incorporated by reference.

BACKGROUND

1. Field of the Invention

The present invention relates to an apparatus and a method for detecting press and is particularly suitable for use in an apparatus and a method for detecting a user's pressing operation.

2. Description of the Related Art

A known press detection apparatus for detecting a user's pressing operation on a press target detects the user's pressing operation while reducing the influence of a vibration applied to the press target. An example of the vibration applied to the press target is, in the case where the press target is an object (for example, a touch panel) provided in a vehicle, a vibration that is applied to the press target caused by the vibration of the vehicle.

Japanese Unexamined Patent Application Publication No. 2014-142813 describes a technique for preventing the false operation of mobile terminals, such as smartphones, with a pressure sensor disposed at a side position where a pressing force is applied when the user grips the casing. The technique prevents the false operation by making a signal output from the touch panel valid (when the signal is invalid) only when a pressure value is detected in a predetermined form by the pressure sensor (typically, when the user grips the mobile terminal).

In detecting a user's pressing operation, in general, a first event in which a definitive value based on a pressing force caused by the pressing operation (a value for use in a determination of the pressing operation, or the value of the pressing force itself) becomes a first threshold or greater and a second event after the definitive value becomes the first threshold or greater in which the definitive value becomes a second threshold or less are detected. The detection of the first event is performed to detect a user's intentional press of the press target, and the detection of the second event is performed to detect the release of the user's intentional press. Normally, some event occurs in response to the detection of the first event and the detection of the second event.

In a first state before the first event is detected, the user pushes a finger (or another object other than the finger, but here it is a finger) against the press target, while in a second state, releases the finger from the press target. For this reason, in the first state, detection of the first event is required when the user intentionally pushes a finger, while in the second state, detection of the second event is required when the user intentionally releases the finger from the press target. If those requirement are not fulfilled, an event occurs in a manner different from the one the user supposes, possibly causing the user to feel uncomfortable.

Thus, since requirements differ between the first state and the second state, appropriate processing for those requirements for the individual states is needed to meet the requirements. However, there were no known techniques for executing such processing. For example, Japanese Unexamined Patent Application Publication No. 2014-142813 described above does not describe a technique for executing processing that meets the requirements for both of the first state and the second state at all.

SUMMARY

Accordingly, it is an object of the present disclosure to enable processing that meets the requirement for both of the first state before a definitive value based on the pressing force becomes the first threshold or greater and the second state after the definitive value becomes the first threshold or greater, in which the definitive value becomes the second threshold or less.

In an aspect of the present disclosure, a determination unit determines a temporal change in the definitive value based on a temporal change in the pressing force, detects a first event in which the definitive value becomes a first threshold or greater from a value less than the first threshold, and after the definitive value exceeds the first threshold, detects a second event in which the definitive value becomes equal to or less than a second threshold determined based on the peak value of the definitive value. When determining the temporal change in the definitive value, in a first state before the first event is detected, the determination unit prevents the definitive value from increasing steeply when the pressing force has increased steeply, and decreases the definitive value steeply when the pressing force has decreased steeply, and in a second state before the second event is detected and after the first event is detected, the determination unit prevents the definitive value from increasing steeply when the pressing force has increased steeply, and prevents the definitive value from decreasing steeply when the pressing force has decreased steeply.

In the aspect of the disclosure, in the first state, a steep increase in the definitive value when the pressing force has increased steeply is prevented. Therefore, even if the detected pressing force has increased steeply because of vibration applied to the press target, the definitive value is unlikely to exceed the first threshold to eliminate or reduce false detection (detection of the first event despite the user's intention), increasing the probability that the first event is detected when a user's intentional finger press operation is performed.

According to the aspect of the disclosure, in the first state, the definitive value decreases steeply when the pressing force has decreased steeply. In the first state, the press target may be unintentionally pressed by the user (for example, something happens to hit the press target), and the press may be immediately cancelled, or the user may perform a pressing operation by mistake but may immediately cancel the pressing operation. In consideration of it, when the pressing operation on the press target is canceled in the first state, the configuration of the disclosure allows the definitive value to be decreased steeply in response to the decrease in the pressing force. If the pressing force is steeply decreased because of vibration applied to the press target, the definitive value is also steeply decreased in response to it. However, this does not cause any false detection, and there is no problem.

According to the aspect of the disclosure, in the second state, a steep increase in the definitive value when the pressing force has increased steeply is prevented. This prevents the peak value when a vibration is applied to the press target from deviating from an assumed peak value under no vibration. This allows, even if a vibration is applied to the press target, the second threshold, which is determined on the basis of the peak value, to be an appropriate value based on the second threshold under no vibration.

According to the aspect of the disclosure, in the second state, a steep decrease in the definitive value when the pressing force has decreased steeply is prevented. Therefore, even if the pressing force has decreased steeply because of the vibration, the definitive value is unlikely to fall below the second threshold to eliminate or reduce false detection (detection of the second event despite the user's intention), increasing the probability that the second event is detected when the user's finger is intentionally released.

Thus, according to the aspect of the disclosure, processing that meets the requirements for both of the first state and the second state can be performed.

BRIEF DESCRIPTION OF THE DRAWINGS

FIG. 10 is a flowchart illustrating an example of the operation of a determination unit according to an embodiment of the invention.

DESCRIPTION OF THE PREFERRED EMBODIMENTS

Figure 1:
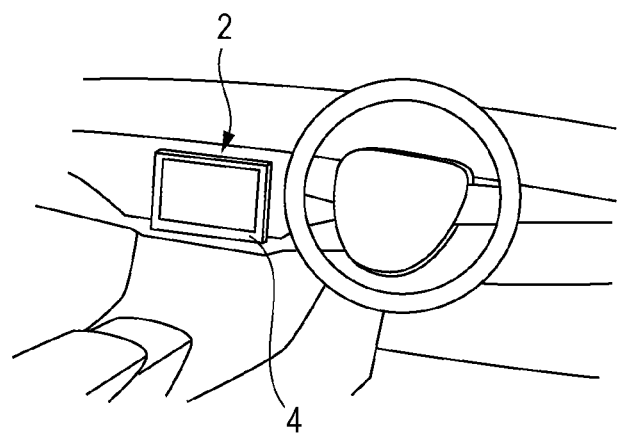
FIG. 1 is a diagram illustrating a display input device provided in the passenger compartment of a vehicle.
Figure 2:
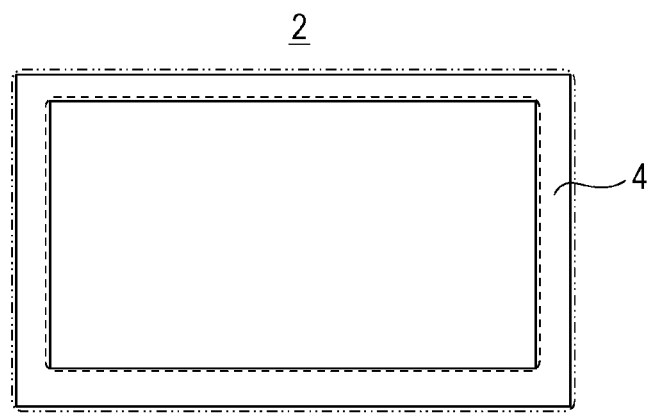
FIG. 2 is a front view of the display input device.

An embodiment of the present invention will now be described with reference to the drawings. FIG. 1 is a diagram illustrating a display input device 2 (corresponding to "a touch input device") connected to a press detection apparatus 1 according to the embodiment (FIG. 4) that is provided in the passenger compartment of a vehicle. FIG. 2 is a front view of the display input device 2.

The display input device 2 is a device having the function of displaying an image and the function of receiving a user input of a touch operation (a so-called touch screen). As illustrated in FIG. 2, a contact detectable area 3, which is the largest area in which a user touch operation can be detected, is formed on the front of the display input device 2. The contact detectable area 3 is equal to the largest image display area. A press detectable area 5 is formed on the front of the display input device 2 in an area including the contact detectable area 3 and the front area of a frame member 4 surrounding the contact detectable area 3. The press detectable area 5 is equal to the entire front area of the display input device 2. The contact detectable area 3 and the press detectable area 5 will be described in detail later.

Figure 3:
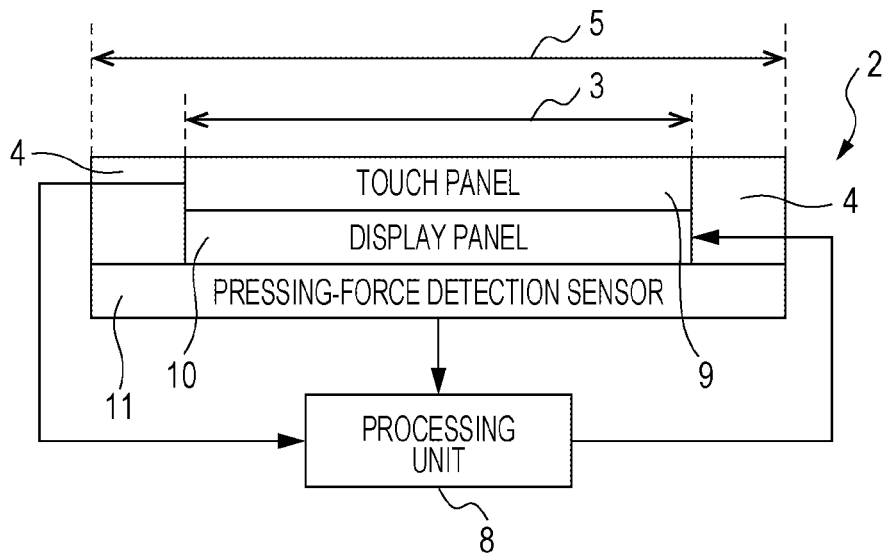
FIG. 3 is a diagram illustrating an example configuration of a processing unit incorporating a press detection apparatus according to an embodiment of the invention and a display input device.

FIG. 3 is a schematic diagram illustrating an example configuration of a processing unit 8 including the press detection apparatus 1 according to the embodiment and the display input device 2. As illustrated in FIG. 3, the display input device 2 includes a touch panel 9, a display panel 10, and a pressing-force detection sensor 11. FIG. 3 clarifies the relationship among the touch panel 9, the display panel 10, and the pressing-force detection sensor 11, and the relationship among those components, the contact detectable area 3, and the press detectable area 5, schematically illustrating the components of the display input device 2 in a simplified manner. The top surface in FIG. 3 is the front of the display input device 2.

As illustrated in FIG. 3, a front area of the display input device 2 corresponding to the entire front area of the touch panel 9 is provided with the contact detectable area 3 in which contact on the touch panel 9 can be detected. The touch panel 9 detects contact to the contact detectable area 3 in a predetermined cycle and outputs contact position information indicating the coordinates of the contact position (if contact is not detected, the coordinates indicating the non-detection) to the processing unit 8. The touch panel 9 continuously executes contact detection and output of the contact position information in a predetermined cycle while the power of the processing unit 8 is on.

The display panel 10 is disposed on the back of the touch panel 9. The display panel 10 displays an image generated by the processing unit 8. Examples include a liquid crystal panel and an organic electroluminescence (EL) panel.

The frame member 4 is provided so as to surround the touch panel 9 and the display panel 10. The touch panel 9 and the display panel 10 are supported by the frame member 4.

The display input device 2 is provided with the pressing-force detection sensor 11 on the back of the display panel 10. As illustrated in FIG. 3, the entire front area of the pressing-force detection sensor 11 includes the contact detectable area 3 (the entire front area of the touch panel 9) and the front area of the frame member 4 surrounding the contact detectable area 3. In other words, the entire front area of the pressing-force detection sensor 11 is equal to the entire front area of the display input device 2. The press detectable area 5 is formed over the entire front area of the display input device 2.

The pressing-force detection sensor 11 detects a pressing force applied to the press detectable area 5 in a predetermined cycle and outputs pressing force information indicating the pressing force to the processing unit 8. The pressing-force detection sensor 11 continuously executes the detection of the pressing force and the output of the pressing force information in a predetermined cycle while the power of the processing unit 8 is on.

The press detection apparatus 1 according to the embodiment does not determine contact to the contact detectable area 3 to be valid when detecting the contact. The press detection apparatus 1 detects a pressing force applied to the press detectable area 5 in addition to the contact to the contact detectable area 3 and determines the contact to be valid only when detecting contact to the contact detectable area 3 and a definitive value based on the pressing force (described later) has become a threshold or greater. Thus, only when the user performs a pressing operation so as to press down on the contact detectable area 3 is the contact valid. This allows the user to perform a reliable operation to prevent the occurrence of incorrect operation. The display input device 2 is disposed in a vehicle. For this reason, the vibration generated in the vehicle is transferred to the display input device 2. The press detection apparatus 1 according to the embodiment executes a determination of the pressing operation while reducing the influence of the vibration.

The configuration and processing of the press detection apparatus 1 will be described in detail below. For the convenience of description, suppose that the display panel 10 displays a graphical user interface (GUI) in which a plurality of accessible objects are displayed and that a user's pressing operation is performed to select an object. In the following description, the user's pressing operation is performed with a user's finger. However, the pressing operation may be performed using an object other than the finger (for example, a rod-like member).

Figure 4:
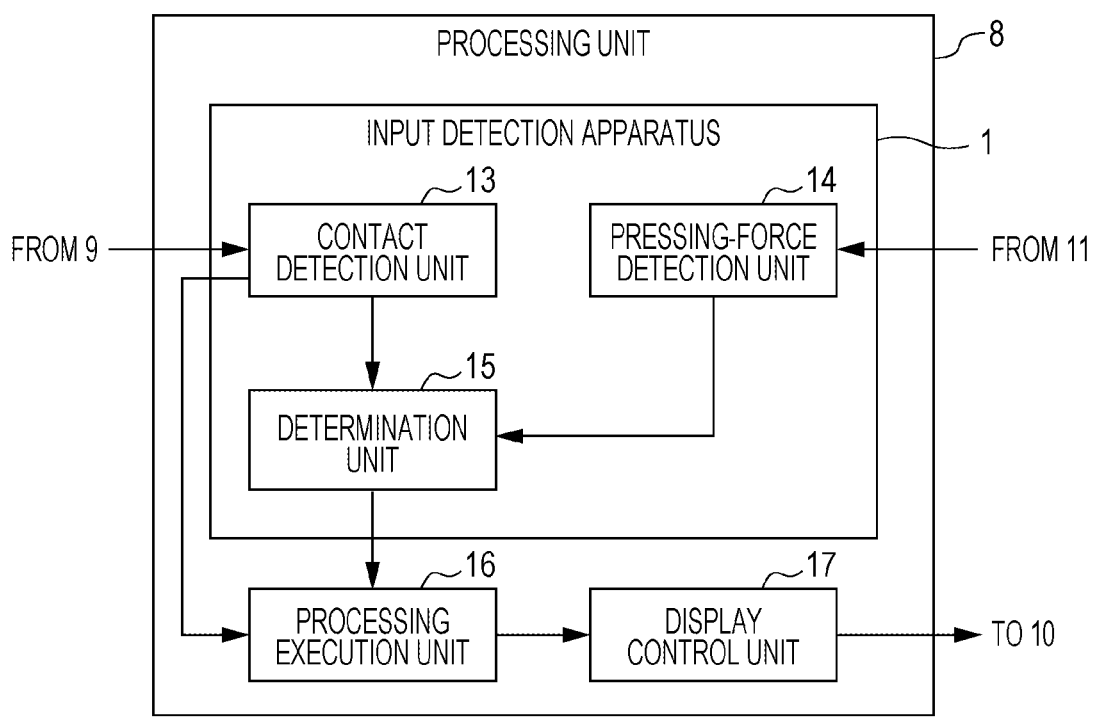
FIG. 4 is a block diagram illustrating an example of the functional configuration of the processing unit incorporating the press detection apparatus according to an embodiment of the invention.

FIG. 4 is a block diagram illustrating an example of the functional configuration of the processing unit 8 including the press detection apparatus 1 according to the embodiment. As illustrated in FIG. 4, the processing unit 8 according to the embodiment includes, as its functional configuration, a contact detection unit 13, a pressing-force detection unit 14, a determination unit 15, a processing execution unit 16, and a display control unit 17. Among them, the contact detection unit 13, the pressing-force detection unit 14, and the determination unit 15 constitute the press detection apparatus 1 according to the embodiment.

The functional blocks 13 to 17 can be any of hardware, a digital signal processor (DSP), and software. In the case of software, the functional blocks 13 to 17 actually include a central processing unit (CPU), a random access memory (RAM), a read-only memory (ROM), and so on of a computer and are implemented by operating programs stored in recording media, such as the RAM, the ROM, a hard disk, and a semiconductor memory.

The contact detection unit 13 determines whether the contact detectable area 3 is touched on the basis of contact position information input from the touch panel 9 in a predetermined cycle, and if the contact detectable area 3 is touched, detects the contact position and outputs detected-contact-position information indicating the detected contact position to the display control unit 16.

The pressing-force detection unit 14 detects a measured value indicating a pressing force applied to the press detectable area 5 on the basis of pressing force information received from the pressing-force detection sensor 11 in a predetermined cycle. In other words, the measured value detected by the pressing-force detection unit 14 is a value indicating the actual pressing force itself detected by the pressing-force detection sensor 11. The pressing-force detection unit 14 outputs the detected measured value to the determination unit 15.

When a definitive value based on the measured value becomes a first threshold or greater from a value less than the first threshold in a state in which contact to the contact detectable area 3 is detected by the contact detection unit 13, the determination unit 15 detects it (a first event), and thereafter when the definitive value becomes a second threshold or less, the determination unit 15 detects it (a second event). In particular, in a first state before the first event is detected, the determination unit 15 prevents the definitive value from increasing steeply when the pressing force has increased steeply, and steeply decreases the definitive value when the pressing force has decreased steeply. In a second state after the first event is detected, before the second event is detected, the determination unit 15 prevents the definitive value from increasing steeply when the pressing force has increased steeply, and prevents the definitive value from decreasing steeply when the pressing force has decreased steeply. The processing of the determination unit 15 will be described below.

Figure 5:
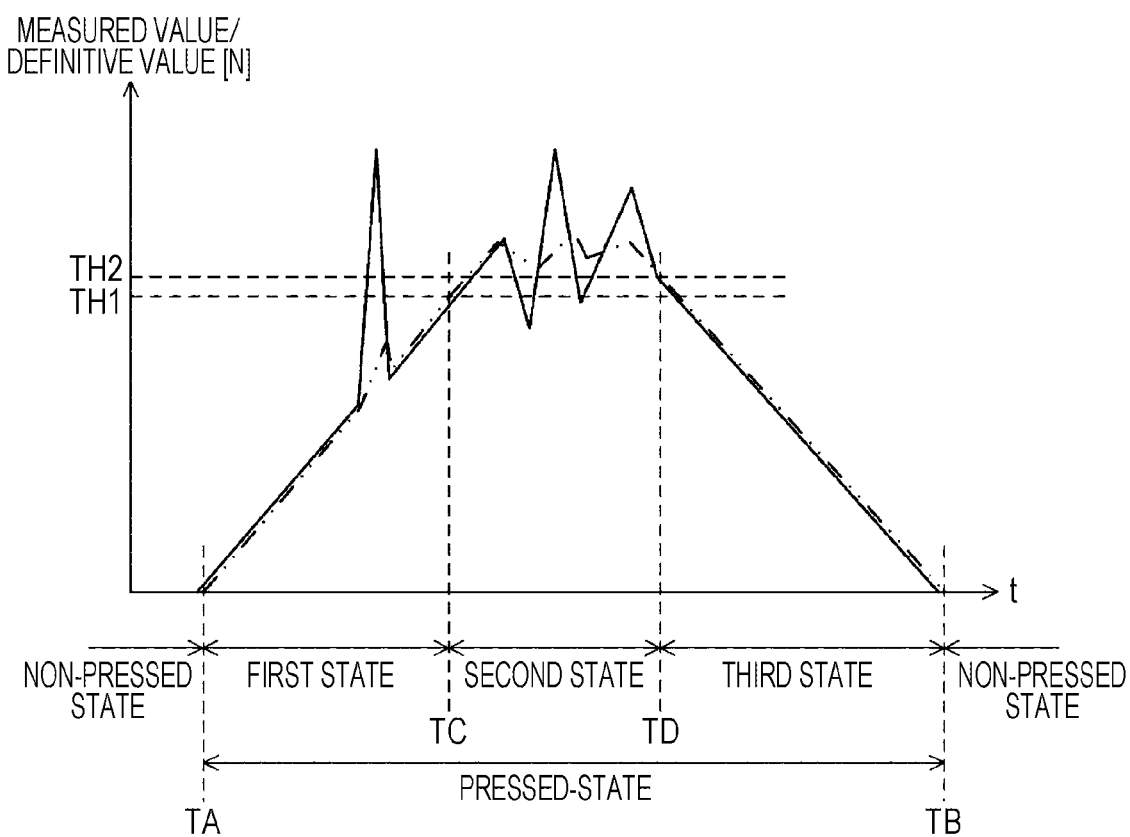
FIG. 5 is a diagram illustrating changes in the measured value and the definitive value.

First, the basic processing of the determination unit 15 will be described. FIG. 5 is a diagram illustrating changes in the measured value and the definitive value using graphs on a chart in which the passage of time is expressed on the horizontal axis and the measured value and the definitive value (unit: [N]) are expressed on the vertical axis. The definitive value and the measured value are plotted at different positions for viewability of the drawing.

The determination unit 15 receives the measured value from the pressing-force detection unit 14 in a predetermined cycle, as described above. When the measured values received in the predetermined cycle are plotted on the chart, a waveform that exhibits a temporal change in the measured value (the pressing force) (the waveform indicated by the solid line in FIG. 5) is formed, as illustrated in FIG. 5. The determination unit 15 determines a definitive value using the input measured value every time the measured value is input (how the definitive value is determined will be described in detail later). When the definitive values determined in the predetermined cycle are plotted on the chart, a waveform indicating a temporal change in the definitive value (the waveform indicated by the two-dot chain line in FIG. 5) is formed, as illustrated in FIG. 5. Thus, the determination unit 15 determines the temporal change in the definitive value on the basis of the temporal change in the measured value (the pressing force) detected by the pressing-force detection unit 14. FIG. 5 is a diagram for illustrating the determination of the temporal change in the definitive value based on the temporal change in the measured value, and the relationship between the measured value and the definitive value is not exactly congruous.

Referring to FIG. 5, the state in which measured values indicating zero [N] or less are input to the determination unit 15 is referred to as the "non-pressed state", and the state in which measured values greater than zero [N] are input is referred to as the "pressed state". The pressed state is, in other words, a state in which a pressing force exceeding zero [N] is detected by the pressing-force detection sensor 11. The possible causes of the generation of the pressing force include not only a user's pressing operation but also a vibration that influences the display input device 2 and a user's unintentional bump of an object against the press detectable area 5. In the example of FIG. 5, the non-pressed state is before timing TA and after timing TB, and the pressed state is between timing TA and timing TB.

The determination unit 15 performs a first determination and a second determination using a definitive value not using a measured value. In other words, the determination unit 15 uses the measured value as the definitive value during the non-pressed state (accordingly, the definitive value≤0[N]) and does not perform a first determination processing (described later). When the determination unit 15 determines a definitive value greater than 0[N] in the non-pressed state (a measured value greater than 0[N] is input), the determination unit 15 recognizes that the display input device 2 has entered the pressed state and monitors whether the definitive value has become a first threshold TH1 (a fixed value) or greater from a value less than the first threshold TH1. This monitoring processing is referred to as "first determination processing". If the definitive value becomes the first threshold TH1 or greater from below the first threshold TH1, the determination unit 15 detects the first event (i.e., the definitive value has become the first threshold TH1 or greater from below the first threshold TH1).

In the example of FIG. 5, since the definitive value is the first threshold TH1 or greater at timing TC, the determination unit 15 detects the first event at timing TC. The state from the start of the pressed state to the detection of the first event is hereinafter referred to as the "first state". In the example of FIG. 5, the state between timing TA and timing TC is the first state.

After detecting the first event, the determination unit 15 determines a definitive value in a predetermined cycle and determines a peak value and a second threshold TH2 in synchronism with the determination of the definitive value. Specifically, the determination unit 15 determines the maximum definitive value as the peak value in each cycle from the timing at which the first event is detected to the current timing. Accordingly, if the definitive value determined at this timing is greater than the peak value at one cycle before this timing, the determination unit 15 determines the definitive value determined at this timing to be the peak value at this timing. In contrast, if the definitive value determined at this timing is less than the peak value at one cycle before this timing, then the determination unit 15 determines the peak value at one cycle before this timing to be the peak value at this timing.

The determination unit 15 determines a value obtained by subtracting a predetermined amount from the determined peak value to be the second threshold TH2. In other words, the second threshold TH2 is not a fixed value but a variable value determined from the peak value. Determining the second threshold TH2 in this way allows the definitive value to be equal to or less than the second threshold TH2 ideally in the process of moving the finger away from the display input device 2 after the user' press reaches its peak. How the second threshold TH2 is determined from the peak value is not limited to the method illustrated in this embodiment. For example, a value obtained by multiplying the peak value by a fixed coefficient (for example, 0.8) may be used as the second threshold TH2.

The determination unit 15 executes the following processing while determining the definitive value, the peak value, and the second threshold TH2 in a predetermined cycle. In other words, the determination unit 15 monitors whether the definitive value has become the second threshold TH2 or less from a value exceeding the second threshold TH2. This monitoring processing is referred to as "second determination processing". If the definitive value becomes the second threshold TH2 or less from a value greater than the second threshold TH2, the determination unit 15 detects the second event (i.e., the definitive value has become the second threshold TH2 or less from the value exceeding the second threshold TH2).

In the example of FIG. 5, since the definitive value is the second threshold TH2 or less at timing TD, the determination unit 15 detects the second event at timing TD. The state after the first event is detected by the determination unit 15 until the second event is detected is referred to as the "second state". In the example of FIG. 5, the second state is between timing TC and timing TD.

After detecting the second event, the determination unit 15 monitors whether the definitive value has become 0[N] or less. This monitoring processing is referred to as "third determination processing". If the definitive value has become 0[N] or less, the determination unit 15 stops the third determination processing and monitors whether the definitive value has exceeded 0[N] again.

In the example of FIG. 5, since the definitive value has become 0[N] or less at timing TB, the display input device 2 enters the non-pressed state at timing TB. The state from the detection of the second event by the determination unit 15 until the non-pressed state is referred to as the "third state". In the example of FIG. 5, the third state is between timing TD and timing TB.

In this embodiment, the first determination processing is not executed by the determination unit 15 in the third state, and even if the definitive value has become the first threshold TH1 or greater in the third state, the first event is not detected. This is for the purpose of preventing the first event from being detected even though the user does not intentionally perform the pressing operation because the definitive value can exceed the first threshold TH1 in the third state owing to vibration, shivering of a finger, or the like.

In this embodiment, the first determination processing is not performed again unless the display input device 2 enters the non-pressed state after the third state. This is due to the following reasons. The pressing operation is normally performed in a state in which the contact detectable area 3 is not pressed by another means. Furthermore, even in a continuous pressing operation, the user starts a new pressing operation after completely releasing the finger from the contact detectable area 3. Therefore, the first determination is not performed unless the display input device 2 enters the non-pressed state after the third state to thereby reduce the possibility that the first event is detected in cases other than a normal pressing operation.

This is the basic processing of the determination unit 15. As will become apparent later, if the first event is detected by the determination unit 15 when contact to the contact detectable area 3 is detected by the contact detection unit 13, the user's selection of an object is confirmed (i.e., the contact becomes valid), and a predetermined action occurs for the object. The predetermined action may be any action that informs the user that the selection of the object has been confirmed, for example, a momentary change in the size of the object and shivering of the object. If the second event is detected by the determination unit 15 thereafter, the separation (release) of the finger becomes valid, and the screen displayed on the display panel 10 switches to a screen appropriate for the selected object.

Requirements differ among the first state, the second state, and the third state. Specifically, in the first state, the user who performs a pressing operation for selecting an object pushes the finger against the display input device 2 with the recognition that no object selection has been confirmed (no appropriate action has been generated). Therefore, it is required for the first state that the first event be detected when the user intentionally pushes a finger.

In the second state, the user releases the finger from the display input device 2 with the recognition that the selection of the object has been confirmed. Therefore, it is required for the second state that the second event be detected when the user intentionally releases the finger from the display input device 2. Since the second threshold TH2 is a variable value determined on the basis of the peak value, it is required for the second state that processing associated with it be executed.

It is required for the third state that the display input device 2 shift to the non-pressed state as fast as possible in response to the release of the user's finger from the contact detectable area 3 and that, if a new pressing operation is performed, the first determination processing can be performed correspondingly. Since, in the non-pressed state, the first to third determination processing operations are not performed, the processing load is small. Also in this regard, it is required to shift to the non-pressed state as fast as possible in response to the release of the user's finger.

The determination unit 15 according to this embodiment determines definitive values in the individual states in consideration of the requests for the first to third states using the following method. The processing of the determination unit 15 will be described in detail below for each of the first to third states.

First State

In the first state, the determination unit 15 prevents the definitive value from increasing steeply when the pressing force has increased steeply, and steeply decreases the definitive value when the pressing force has decreased steeply. This method used in determining the definitive value is referred to as the "first setting method".

In the first state, the determination unit 15 prevents the definitive value from increasing steeply when the pressing force has increased steeply to provide the following advantageous effect, thereby fulfilling the requirement for the first state. In other words, even if the pressing force detected by the pressing-force detection sensor 11 has increased steeply because of vibration applied to the display input device 2, the definitive value is unlikely to exceed the first threshold TH1 to eliminate or reduce false detection (detection of the first event despite the user's intention), increasing the probability that the first event is detected when a user's intentional finger press operation is performed.

In the first state, the determination unit 15 decreases the definitive value steeply when the pressing force has decreased steeply to provide the following advantageous effect, thereby fulfilling the requirements for the first state. In the first state, the press detectable area 5 may be unintentionally pressed by the user (for example, something happens to contact the press detectable area 5), and the press may be immediately cancelled, or the user may perform a pressing operation by mistake but may immediately cancel the pressing operation. Therefore, when the press detectable area 5 is pressed by an irregular method other than the pressing operation, and the pressing operation is immediately canceled, the determination unit 15 can decrease the definitive value steeply in response to the cancellation of the press to shift the input display device 2 to the non-pressed state by performing the above processing. If the pressing force is steeply decreased because of vibration applied to the display input device 2, the definitive value is also steeply decreased in response to it. However, this does not cause any false detection, and there is no problem.

In preventing the definitive value from increasing steeply when the pressing force has increased steeply, the determination unit 15 places a limitation on the increase amount of the definitive value per unit time. Specifically, the determination unit 15 executes the following processing every time a measured value is input. Let timing N be a timing at which the measured value is input, and timing N−1 be a timing one cycle before timing N. If the measured value input from the pressing-force detection unit 14 at timing N is less than the sum of a definitive value that the determination unit 15 determines at timing N−1 and a predetermined increase reference amount Z, then the determination unit 15 determines the measured value input at timing N as a definitive value at timing N. In contrast, if the measured value input at timing N is equal to or greater than the sum of the definitive value determined at timing N−1 and the increase reference amount Z, then the determination unit 15 determines the sum of the definitive value determined at timing N−1 and the increase reference amount Z as a definitive value at the timing N.

Figure 6:
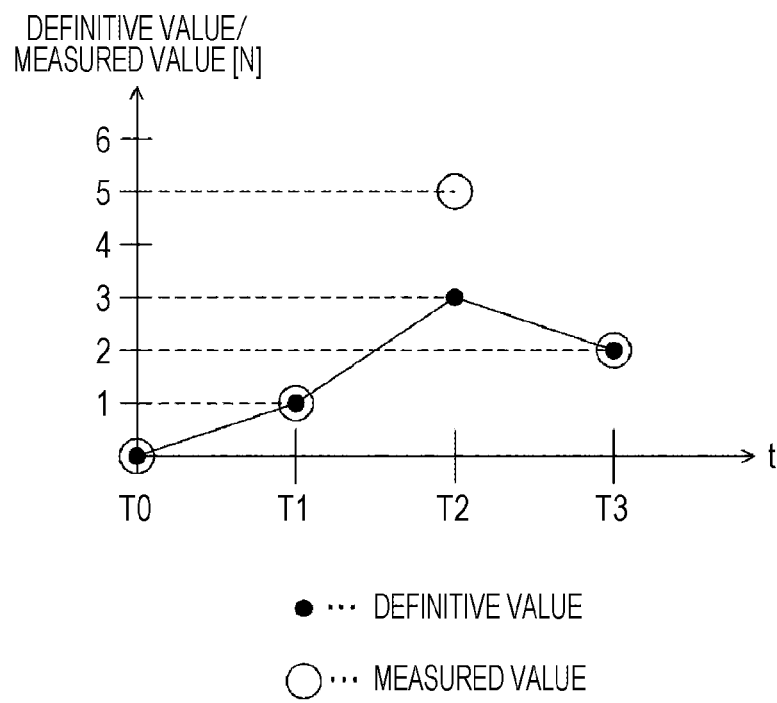
FIG. 6 is a diagram illustrating changes in the measured value and the definitive value.

FIG. 6 is a diagram illustrating changes in the measured value and the definitive value using graphs on a chart in which the passage of time is expressed on the horizontal axis and the measured value and the definitive value are expressed on the vertical axis. The horizontal axis of FIG. 6 is scaled according to the cycle in which the determination unit 15 determines the definitive value (i.e., the cycle in which the pressing-force detection unit 14 detects the measured value). The processing of the determination unit 15 will be specifically described with reference to FIG. 6 on the assumption that the increase reference amount Z is 2[N].

Referring to FIG. 6, the measured value and the definitive value are 0[N] at timing T0. In this case, the determination unit 15 determines the upper limit at timing T1 to be 2[N]. The upper limit at timing T1 is the maximum value that the definitive value can take at timing T1, and the definitive value cannot exceed the upper limit at any timing. The upper limit at timing T1 is determined from "definitive value (0[N]) at timing T0+increase reference amount Z (2[N])".

Referring to FIG. 6, when a measured value indicating 1[N] is input at timing T1, the determination unit 15 determines the definitive value to be 1[N]. This is because the measured value (1[N]) input at timing T1 is less than the upper limit (2[N]) at timing T1.

Next, the determination unit 15 determines the upper limit at timing T2 to be 3[N]. The upper limit at timing T2 is determined from "definitive value (1[N]) at timing T1+increase reference amount Z (2[N])".

When a measured value indicating 5[N] is input at timing T2, the determination unit 15 determines the definitive value to be 3[N], which is the same as the upper limit (3[N]) at timing T2. This is because the measured value (5[N]) input at timing T2 is greater than the upper limit (3[N]) at timing T2.

Next, the determination unit 15 determines the upper limit at timing T3 to be 5[N]. The upper limit at timing T3 is determined from "definitive value (3[N]) at timing T2+increase reference amount Z (2[N]).

When a measured value indicating 2[N] is input at timing T3, the determination unit 15 determines the definitive value to be 2[N]. This is because the measured value (2[N]) input at timing T3 is less than the upper limit (5[N]) at timing T3.

Figure 7:
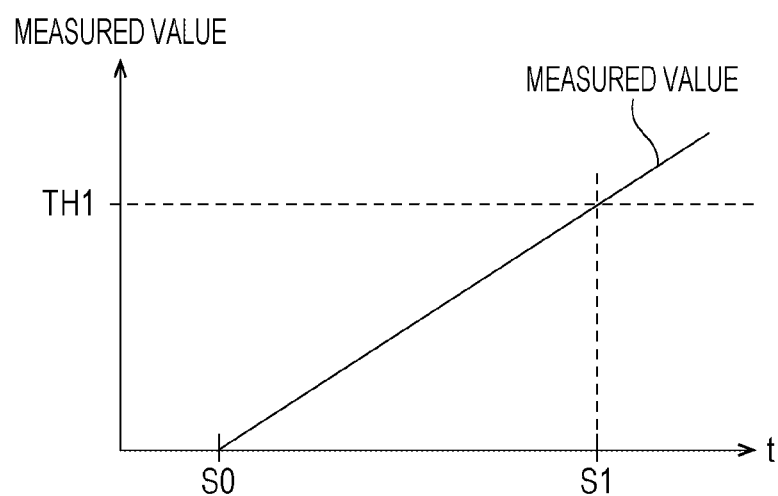
FIG. 7 is a diagram illustrating a change in the measured value.
Figure 8:
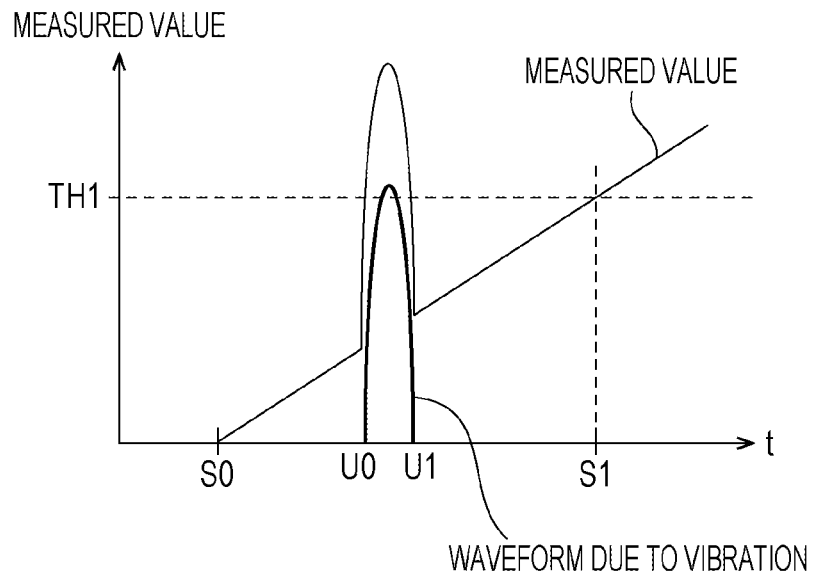
FIG. 8 is a diagram illustrating changes in the measured value.
Figure 9:
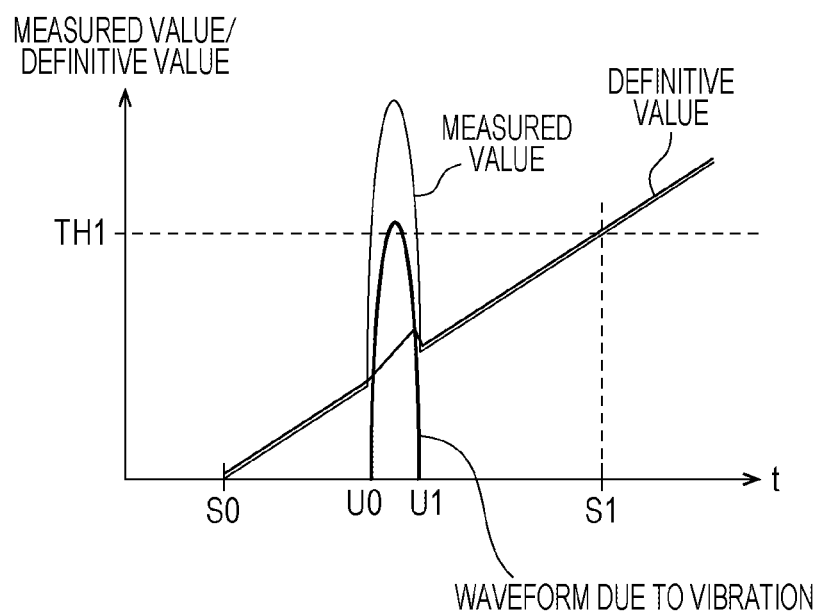
FIG. 9 is a diagram illustrating changes in the measured value and the definitive value.

The determination of the definitive value using the above method prevents the definitive value from increasing steeply when the pressing force has increased steeply. FIGS. 7, 8, and 9 are diagrams illustrating changes in the measured value (in FIG. 9, the measured value and the definitive value) using graphs on charts in which the passage of time is expressed on the horizontal axis, and the measured value is expressed on the vertical axis.

Suppose that the display input device 2 is not influenced by vibration at all. In this case, when the user performs a pressing operation, the measured value ideally increases gradually with the passage of time from timing S0 at which the pressing operation is started to reach the first threshold TH1 at timing S1 after a certain time has passed, as illustrated in FIG. 7. This is because the user recognizes that a press-down operation is needed to make the contact (touch operation) valid (in this embodiment, to bring the definitive value to the first threshold TH1 or greater), and the user presses down the contact position until the contact becomes valid.

Suppose that a vibration is applied to the display input device 2 after the user starts a pressing operation before the measured value reaches the first threshold TH1. The waveform of a pressing force applied to the display input device 2 because of a vibration is generally a high-frequency waveform. In this case, the measured value may increase steeply to exceed the first threshold TH1 because of the vibration.

FIG. 8 illustrates a change in the measured value when a vibration is generated in the example of FIG. 7. The thick line in FIG. 8 indicates the waveform of the pressing force applied to the pressing-force detection sensor 11 caused by the vibration from timing U0 to timing U1 (timing S0<timing U0<timing U1<timing S1) (simplified for the convenience of description). In the example of FIG. 8, the measured value increases steeply from timing U0 because of the vibration to reach the first threshold TH1 in the vicinity of timing U0.

If the determination of the pressing operation is performed by comparing the measured value with the first threshold TH1, without applying the present invention, the contact is determined to be valid in the vicinity of timing U0. In this case, the user, who recognizes that the contact becomes valid only when a pressing operation is performed, can have the impression that processing on the validity/invalidity of the contact is performed in an abnormal manner.

FIG. 9 is a diagram illustrating a change in the definitive value determined by the determination unit 15 of the embodiment in the case of FIG. 8. In FIG. 9, the definitive value is increased a little for viewability of the drawing so that the definitive value and the measured value are plotted at slightly different vertical positions even when having the same value. According to the embodiment, if the measured value has increased steeply to exceed the increase reference amount Z in one cycle, the amount of increase in the definitive value at the current timing from the preceding timing is limited to the increase reference amount Z. For this reason, even if the measured value changes steeply because of vibration, as illustrated from around timing U0 to around timing U1 in FIG. 9, the definitive value does not change steeply, thus reducing the possibility that the definitive value exceeds the first threshold TH1 because of the vibration.

In the first state, the determination unit 15 does not prevent the steep decrease in the definitive value using a decrease reference amount Y, which will be described in the description of the processing of the determination unit 15 in the second state. Thus, the definitive value is decreased steeply when the pressing force has decreased steeply.

Second State

In the second state, the determination unit 15 prevents the definitive value from increasing steeply when the pressing force has increased steeply and prevents the definitive value from decreasing steeply when the pressing force has decreased steeply. This method used in determining the definitive value is referred to as the "second setting method".

In the second state, the determination unit 15 prevents the definitive value from increasing steeply when the pressing force has increased steeply to provide the following advantageous effect, thereby fulfilling the requirement for the second state. The second threshold TH2 is a variable value determined on the basis of the peak value. This prevents the peak value when a vibration is applied to the display input device 2 in the second state from deviating from an assumed peak value under no vibration. This allows, even if a vibration is applied to the display input device 2, the second threshold TH2, which is determined on the basis of the peak value, to be an appropriate value based on the second threshold TH2 under no vibration.

In the second state, the determination unit 15 prevents the definitive value from decreasing steeply when the pressing force has decreased steeply to provide the following effect, thereby fulfilling the requirements for the second state. In other words, even if the pressing force has decreased steeply because of vibration, the definitive value is unlikely to fall below the second threshold TH2. Also, when the pressing force has decreased steeply because of the user's hand shaking in the pressing operation, the definitive value is unlikely to fall below the second threshold TH2. This prevents false detection (detection of the second event despite the user's intention), increasing the probability that the second event is detected when the user's finger is intentionally released.

The determination unit 15 places a limitation on the increase amount of the definitive value per unit time and places a limitation on the decrease amount of the definitive value per unit time to thereby prevent the definitive value from increasing steeply when the pressing force has increased steeply and prevents the definitive value from decreasing steeply when the pressing force has decreased steeply.

Specifically, the determination unit 15 executes the following processing every time a measured value is input. Let timing N be a timing at which the measured value is input, and timing N−1 be a timing one cycle before timing N. If the measured value input from the pressing-force detection unit 14 at timing N is less than the sum of a definitive value that the determination unit 15 determines at timing N−1 and the predetermined increase reference amount Z and greater than the definitive value determined at timing N−1 minus the predetermined decrease reference value Y, then the determination unit 15 determines the measured value input at timing N as a definitive value at timing N. In contrast, if the measured value input at timing N is equal to or greater than the sum of the definitive value determined at timing N−1 and the increase reference amount Z, then the determination unit 15 determines the sum of the definitive value determined at timing N−1 and the increase reference amount Z as a definitive value at the timing N. If the measured value input at timing N is equal to or less than the definitive value determined at timing N−1 minus the decrease reference value Y, then the determination unit 15 determines the definitive value determined at timing N−1 minus the decrease reference value Y as a definitive value at timing N.

The above processing allows, for a case in which the measured value has increased steeply by the increase reference amount Z or more in one cycle, limiting the increase amount of the definitive value at this timing from the definitive value at the preceding timing to the increase reference amount Z, and for a case in which the measured value has decreased steeply by the decrease reference amount Y or more in one cycle, limiting the decrease amount of the definitive value at this timing from the definitive value at the preceding timing to the decrease reference amount Y.

Third State

In the third state, the determination unit 15 decreases the definitive value steeply when the pressing force has decreased steeply to provide the following effect, thereby fulfilling the requirements for the third state. It is required for the third state that the display input device 2 shift to the non-pressed state as fast as possible in response to the release of the user's finger from the contact detectable area 3 and that, if a new pressing operation is performed, the first determination processing can be performed appropriately. This processing allows the definitive value to be decreased steeply in response to the cancellation of the press by the user to meet the requirement for the third state.

In this embodiment, the determination unit 15 prevents the definitive value from increasing steeply when the pressing force has increased steeply in the third state. In consideration of it, the determination unit 15 prevents the definitive value from increasing when the pressing force has increased steeply, and decreases the definitive value steeply when the pressing force has decreased steeply by the first setting method. Alternatively, in the third state, the steep increase in the definitive value may not be prevented when the pressing force has increased steeply.

When the determination unit 15 detects the first event in a state in which contact to the contact detectable area 3 is detected by the contact detection unit 13, the determination unit 15 outputs a first notification to the processing execution unit 16. Accordingly, when no contact is detected by the contact detection unit 13 even if the first event is detected, the first notification is not output. If the second event is detected in the case where the determination unit 15 outputs the first notification, the determination unit 15 outputs a second notification to the processing execution unit 16.

When receiving the first notification from the determination unit 15, the processing execution unit 16 recognizes the contact position on the basis of detected-contact-position information received from the contact detection unit 13 at the time the first notification is input. Next, the processing execution unit 16 confirms the selection of the object displayed at the contact position of the GUI of the display panel 10 and instructs the display control unit 17 to generate a predetermined action for the object. When receiving the second notification from the determination unit 15, the processing execution unit 16 instructs the display control unit 17 to change the screen to a screen for the selected object.

When the display control unit 17 is instructed to generate a predetermined action for a predetermined object by the processing execution unit 16, the display control unit 17 controls the display panel 10 to generate the predetermined action. If the display control unit 17 is instructed to change the screen to a screen for the predetermined object by the processing execution unit 16, the display control unit 17 controls the display panel 10 to execute the switching of the screens.

Next, an operation example of the press detection apparatus 1 according to this embodiment will be described with reference to a flowchart. FIG. 10 is a flowchart illustrating the operation of the determination unit 15 after the input display device 2 has shifted from the non-pressed state to the pressed state.

As illustrated in FIG. 10, when detecting a transition from the non-pressed state to the pressed state (step SA1), the determination unit 15 sets the first setting method as a method for determining a definitive value (step SA2). Next, the determination unit 15 monitors whether the definitive value has become 0[N] or less (step SA3). If the definitive value has exceeded 0[N] (step SA3: NO), then the determination unit 15 monitors whether the definitive value has become the first threshold TH1 or greater (step SA4). If the definitive value has become 0[N] or less (step SA3: YES), then the determination unit 15 terminates the processing of the flowchart. When the definitive value becomes 0[N] or less, the pressed state shifts to the non-pressed state.

If the definitive value has become the first threshold TH1 or greater (step SA4: YES), the determination unit 15 detects the first event (step SA5). Next, the determination unit 15 outputs the first notification to the processing execution unit 16 (step SA6). Next, the determination unit 15 sets the second setting method as a method for determining a definitive value (step SA7). Next, the determination unit 15 determines the peak value and the second threshold TH2 from time to time and monitors whether the definitive value has become the second threshold TH2 or less (step SA8).

If the definitive value has become the second threshold TH2 or less (step SA8: YES), the determination unit 15 detects the second event (step SA9). Next, the determination unit 15 outputs the second notification to the processing execution unit 16 (step SA10). Next, the determination unit 15 sets the first setting method as a method for determining a definitive value (step SA11). Next, the determination unit 15 monitors whether the definitive value has become 0[N] or less (step SA12). If the definitive value has become 0[N] or less (step SA12: YES), the determination unit 15 terminates the processing of the flowchart. At the point in time the definitive value has become 0[N] or less, the pressed state shifts to the non-pressed state.

Having described the embodiment, it is to be understood that the above embodiment is merely a specific example of the present invention and that the technical scope of the invention is not limited by the embodiments. In other words, the invention can be embodied in various forms without departing from the spirit and principal features.

For example, the above embodiment has been described using a specific example for preventing the definitive value from increasing steeply when the pressing force has increased steeply (the method of using the increase reference amount Z). However, a method for preventing the definitive value from increasing steeply when the pressing force has increased steeply is not limited to the illustrated example. For example, if the measured value input at this time is greater than the definitive value that the determination unit 15 determined at the preceding timing, the definitive value may be multiplied by a coefficient (for example, 0.8). The steep increase in the definitive value when the pressing force has increased steeply may be prevented using a method in combination with a low-pass filter or another filter. This also applies to a method for preventing the definitive value from decreasing steeply when the pressing force has decreased steeply.

In the above embodiment, in the third state, the determination unit 15 determines the definitive value by the first setting method. In this regard, in the third state the determination unit 15 may determine the definitive value by the second setting method. In this case, a steep decrease in the definitive value is prevented when the pressing force has decreased steeply in the third state, and the timing of the transition to the non-pressed state may be delayed, but no false detection occurs, and it is acceptable.

In one example, the press target of the embodiment is the display input device 2 provided in a vehicle. However, the press target for which the press detection apparatus 1 incorporating the present invention detects a pressing operation is not limited to the in-vehicle display input device 2. In another example, the display input device 2 may be provided in a place other than the vehicle. Other examples include a smartphone and a tablet terminal in or out of the vehicle and a press switch with a mechanical structure to be pressed by the user (a so-called push button).

In the above embodiment, the increase reference amount Z (in the modification, the decrease reference amount Y) is a fixed value. Alternatively, the level or the frequency of the vibration may be detected, and the increase reference amount Z may be dynamically changed.

In the above embodiment, part or all of the processing to be executed by the functional blocks of the press detection apparatus 1 may be cooperatively executed by the press detection apparatus 1 and an external device. In this case, the press detection apparatus 1 and the external device cooperatively function as the "press detection apparatus". For example, part or all of the processing of the determination unit 15 may be executed by a cloud server that communicates with the press detection apparatus 1 over a network.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A press detection apparatus comprising:
    a pressing-force detection unit configured to detect a measured value indicating a pressing force applied to a press target on the basis of pressing force information received from a pressing-force detection sensor; and
    a determination unit configured to determine a temporal change in a definitive value based on a temporal change in the measured value detected by the pressing-force detection unit, detect a first event in which the definitive value becomes a first threshold or greater from a value less than the first threshold, and after the definitive value exceeds the first threshold, detect a second event in which the definitive value becomes equal to or less than a second threshold determined based on a peak value of the definitive value,
    wherein the pressing-force detection unit and the determination unit are implemented by a processor executing programs stored in memory, and
    wherein, when determining the temporal change in the definitive value,
    in a first state before the first event is detected, the determination unit prevents the definitive value from increasing steeply when the pressing force has increased steeply, and decreases the definitive value steeply when the pressing force has decreased steeply, and
    in a second state after the first event is detected and before the second event is detected, the determination unit prevents the definitive value from increasing steeply when the pressing force has increased steeply, and prevents the definitive value from decreasing steeply when the pressing force has decreased steeply.

2. The press detection apparatus according to claim 1, wherein, in a third state after the second event is detected, the determination unit decreases the definitive value steeply when the pressing force has decreased steeply.

3. The press detection apparatus according to claim 2,
    wherein, when preventing the definitive value from increasing steeply when the pressing force has increased steeply, the determination unit places a limitation on the increase in the definitive value per unit time, and
    wherein, when preventing the definitive value from decreasing steeply when the pressing force has decreased steeply, the determination unit places a limitation on the decrease in the definitive value per unit time.

4. The press detection apparatus according to claim 3,
    wherein the pressing-force detection unit detects a measured value indicating a pressing force applied to the press target in a predetermined cycle,
    wherein the determination unit
        determines a definitive value in a predetermined cycle based on the measured value detected in the predetermined cycle by the pressing-force detection unit,
        prevents the definitive value from increasing steeply when the pressing force has increased steeply in such a manner that, if a measured value detected by the pressing-force detection unit at one timing is less than a value obtained by adding an increase reference amount to a definitive value determined by the determination unit at a timing one cycle preceding the one timing, the determination unit determines the measured value at the one timing to be a definitive value at the one timing, and if the measured value at the one timing is equal to or greater than the value obtained by adding the increase reference amount to the definitive value at the preceding timing, the determination unit determines the obtained increase value to be a definitive value at the one timing, and
        prevents the definitive value from decreasing steeply when the pressing force has decreased steeply in such a manner that, if the measured value detected by the pressing-force detection unit at the one timing is greater than a value obtained by subtracting a decrease reference amount from the definitive value determined by the determination unit at the preceding timing, the determination unit determines the measured value at the one timing to be a definitive value at the one timing, and if the measured value at the one timing is less than the value obtained by subtracting the decrease reference amount from the definitive value at the preceding timing, the determination unit determines the obtained decrease value to be the definitive value at the one timing.

5. The press detection apparatus according to claim 4, wherein the press target is a touch input device provided in a vehicle.

6. The press detection apparatus according to claim 1,
    wherein, when preventing the definitive value from increasing steeply when the pressing force has increased steeply, the determination unit places a limitation on the increase in the definitive value per unit time, and
    wherein, when preventing the definitive value from decreasing steeply when the pressing force has decreased steeply, the determination unit places a limitation on the decrease in the definitive value per unit time.

7. The press detection apparatus according to claim 6,
    wherein the pressing-force detection unit detects a measured value indicating a pressing force applied to the press target in a predetermined cycle,
    wherein the determination unit
        determines a definitive value in a predetermined cycle based on the measured value detected in the predetermined cycle by the pressing-force detection unit,
        prevents the definitive value from increasing steeply when the pressing force has increased steeply in such a manner that, if a measured value detected by the pressing-force detection unit at one timing is less than a value obtained by adding an increase reference amount to a definitive value determined by the determination unit at a timing one cycle preceding the one timing, the determination unit determines the measured value at the one timing to be a definitive value at the one timing, and if the measured value at the one timing is equal to or greater than the value obtained by adding the increase reference amount to the definitive value at the preceding timing, the determination unit determines the obtained increase value to be a definitive value at the one timing, and prevents the definitive value from decreasing steeply when the pressing force has decreased steeply in such a manner that, if the measured value detected by the pressing-force detection unit at the one timing is greater than a value obtained by subtracting a decrease reference amount from the definitive value determined by the determination unit at the preceding timing, the determination unit determines the measured value at the one timing to be a definitive value at the one timing, and if the measured value at the one timing is less than the value obtained by subtracting the decrease reference amount from the definitive value at the preceding timing, the determination unit determines the obtained decrease value to be the definitive value at the one timing.

8. The press detection apparatus according to claim 7, wherein the press target is a touch input device provided in a vehicle.

9. A method for detecting press using a press detection apparatus including a pressing-force detection unit configured to detect a measured value indicating a pressing force applied to a press target on the basis of pressing force information received from a pressing-force detection sensor and a determination unit configured to determine a temporal change in a definitive value based on a temporal change in the measured value detected by the pressing-force detection unit, detect a first event in which the definitive value becomes a first threshold or greater from a value less than the first threshold, and detect a second event after the definitive value exceeds the first threshold, in which the definitive value becomes equal to or less than a second threshold determined based on a peak value of the definitive value, the pressing-force detection unit and the determination unit implemented by a processor executing programs stored in memory, the method comprising:
   in a first state before the first event is detected, the determination unit of the press detection apparatus preventing the definitive value from increasing steeply when the pressing force has increased steeply, and decreasing the definitive value steeply when the pressing force has decreased steeply, and
   in a second state after the first event is detected and before the second event is detected, the determination unit of the press detection apparatus preventing the definitive value from increasing steeply when the pressing force has increased steeply, and preventing the definitive value from decreasing steeply when the pressing force has decreased steeply.

10. The press detection method according to claim 9, wherein, in a third state after the second event is detected, the determination unit decreases the definitive value steeply when the pressing force has decreased steeply.

11. The press detection method according to claim 10, wherein, when preventing the definitive value from increasing steeply when the pressing force has increased steeply, the determination unit places a limitation on the increase in the definitive value per unit time, and
   wherein, when preventing the definitive value from decreasing steeply when the pressing force has decreased steeply, the determination unit places a limitation on the decrease in the definitive value per unit time.

12. The press detection method according to claim 11, wherein the pressing-force detection unit detects a measured value indicating a pressing force applied to the press target in a predetermined cycle,
   wherein the determination unit
      determines a definitive value in a predetermined cycle based on the measured value detected in the predetermined cycle by the pressing-force detection unit,
      prevents the definitive value from increasing steeply when the pressing force has increased steeply in such a manner that, if a measured value detected by the pressing-force detection unit at one timing is less than a value obtained by adding an increase reference amount to a definitive value determined by the determination unit at a timing one cycle preceding the one timing, the determination unit determines the measured value at the one timing to be a definitive value at the one timing, and if the measured value at the one timing is equal to or greater than the value obtained by adding the increase reference amount to the definitive value at the preceding timing, the determination unit determines the obtained increase value to be a definitive value at the one timing, and
      prevents the definitive value from decreasing steeply when the pressing force has decreased steeply in such a manner that, if the measured value detected by the pressing-force detection unit at the one timing is greater than a value obtained by subtracting a decrease reference amount from the definitive value determined by the determination unit at the preceding timing, the determination unit determines the measured value at the one timing to be a definitive value at the one timing, and if the measured value at the one timing is less than the value obtained by subtracting the decrease reference amount from the definitive value at the preceding timing, the determination unit determines the obtained decrease value to be the definitive value at the one timing.

13. The press detection method according to claim 12, wherein the press target is a touch input device provided in a vehicle.

14. The press detection method according to claim 9, wherein, when preventing the definitive value from increasing steeply when the pressing force has increased steeply, the determination unit places a limitation on the increase in the definitive value per unit time, and
   wherein, when preventing the definitive value from decreasing steeply when the pressing force has decreased steeply, the determination unit places a limitation on the decrease in the definitive value per unit time.

15. The press detection method according to claim 14, wherein the pressing-force detection unit detects a measured value indicating a pressing force applied to the press target in a predetermined cycle,
   wherein the determination unit
      determines a definitive value in a predetermined cycle based on the measured value detected in the predetermined cycle by the pressing-force detection unit,
      prevents the definitive value from increasing steeply when the pressing force has increased steeply in such a manner that, if a measured value detected by the pressing-force detection unit at one timing is less than a value obtained by adding an increase reference amount to a definitive value determined by the determination unit at a timing one cycle preceding the one timing, the determination unit determines the measured value at the one timing to be a definitive value at the one timing, and if the measured value at the one timing is equal to or greater than the value obtained by adding the increase reference amount to the definitive value at the preceding timing, the determination unit determines the obtained increase value to be a definitive value at the one timing, and prevents the definitive value from decreasing steeply when the pressing force has decreased steeply in such a manner that, if the measured value detected by the pressing-force detection unit at the one timing is greater than a value obtained by subtracting a decrease reference amount from the definitive value determined by the determination unit at the preceding timing, the determination unit determines the measured value at the one timing to be a definitive value at the one timing, and if the measured value at the one timing is less than the value obtained by subtracting the decrease reference amount from the definitive value at the preceding timing, the determination unit determines the obtained decrease value to be the definitive value at the one timing.

16. The press detection method according to claim 15, wherein the press target is a touch input device provided in a vehicle.

* * * * *